United States Patent [19]

Thominet

[11] 3,723,416
[45] Mar. 27, 1973

[54] SUBSTITUTED 2-ARYLALKYLOXY BENZAMIDES

[75] Inventor: Michel Leon Thominet, Paris, France

[73] Assignee: Societe d'Etudes Scientifiques et Industrielles de L-Ile-de-France, Paris, France

[22] Filed: Jan. 22, 1971

[21] Appl. No.: 108,963

Related U.S. Application Data

[63] Continuation in part of Ser. No. 714,795, Mar. 21, 1968, now U.S. Pat. No. 3,594,417.

[30] Foreign Application Priority Data

Apr. 3, 1967  France............................101328
June 23, 1967  France.............................111808

[52] U.S. Cl....................................260/239 BF, 260/243 B, 247.2 A, 268 R, 293.77, 260/306.7, 307 F, 309.7, 326.3, 260/559 S; 424/244, 246, 248, 250, 424/267, 270, 272, 273, 274, 324
[51] Int. Cl......................................C07d 29/30
[58] Field of Search........260/239 BF, 293.77, 326.3

[56] References Cited

UNITED STATES PATENTS

3,342,826  9/1967  Miller et al......................260/294

FOREIGN PATENTS OR APPLICATIONS

1,525  10/1962  France.......................260/293.77
1,098,001  11/1961  Germany....................260/293.77
339,931  9/1959  Switzerland.................260/293.77

*Primary Examiner*— Henry R. Jiles
*Assistant Examiner*— G. Thomas Todd
*Attorney*— Frank M. Nolan

[57] ABSTRACT

The 2-arylalkyloxy-benzamides of this invention are useful for the production of anesthesia, such as local anesthesia, in mammals. When administered intramuscularly, compounds of this invention show significant anesthesia when compared with xylocaine. Again, intradermic injections of 0.2 ml. of a solution of such a compound in concentrations varying from 0.1 to 1.25 mg./ml. effect suppression of platysma tremor produced by the prick of a pin in guinea pigs. The $LD_{50}$ dosage of the compounds evaluated on mice and rats proved compatible in therapeutic use on mammals.

10 Claims, No Drawings

SUBSTITUTED 2-ARYLALKYLOXY BENZAMIDES

This application is a continuation-in-part of the copending application, Ser. No. 714,795, filed Mar. 21, 1968, now U.S. Pat. No. 3,594,417.

This invention relates to 2-arylalkyloxy benzamides and more particularly to 2-arylalkyloxy benzamides having the formula:

(1) 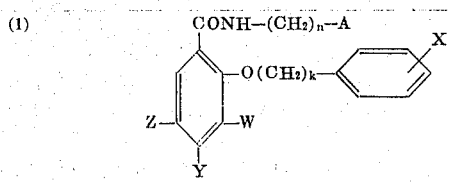

in which A is monoalkylamino, dialkylamino, a monovalent radical having the formula:

(2) 

or a monovalent heterocyclic radical having the formula:

(3) 

in which $p$ and $q$ are 1 or 2, at least one of $p$ and $q$ being 2; Q is methylene, sulphur, oxygen, nitrogen or monoalkylamino; $m$ is a positive integer less than 4; R is an alkyl group having from one to five carbon atoms; W, Y and Z are hydrogen, halogen, amino or alkylamino in which the alkyl group has from one to five carbon atoms; X is H or halogen and $n$ and $k$ are 1 or 2. The monovalent radical (2) may be pyrrolidyl, piperidino, imidazolidinyl, piperazino, methylpiperazino, morpholino or thiazolidinyl. The halogen X, as well as any of the substituents W, Y and Z, may be fluorine, chlorine, bromine or iodine. The alkyl groups of the monoalkylamino and dialkylamino are desirably lower alkyls and preferably alkyl groups of less than six carbon atoms such as methyl, ethyl or isobutyl.

The 2-arylalkyloxy benzamides obtained, their salts of addition with acids and their quaternary ammonium salts are new compounds.

The substituted 2-arylalkyloxy benzamides of this invention are produced by reacting a 2-arylalkyloxy benzoic acid derivative having the formula:

(4) 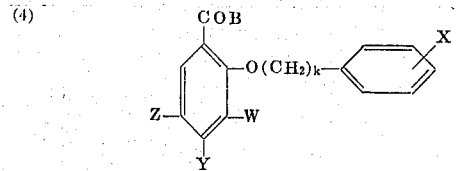

in which B is a labile radical formed by a chlorine atom and the alkoxy groups having from one to five carbon atoms. W, X, Y, Z, k have the same significance as heretofore defined; with a diamine having the formula:

5. 

in which A and n have the same significance as heretofore defined.

Salts of mineral acids (e.g., hydrochloric, sulphuric or phosphoric acids) or salts of organic acids (e.g., acetic, oxalic, tartaric or methanesulphonic acids) are produced by reacting the required acid with the benzamides.

The quaternary ammonium salts are obtained by reacting the benzamides with an alkylating agent (methyl bromide, ethyl iodide, methyl p-toluenesulphonate etc.).

A more comprehensive understanding of this invention is obtained by reference to the following examples.

EXAMPLE I

N-(Diethylaminoethyl)-2-Benzyloxy-4-Amino-5-Chlorobenzamide

82 G. (0.245 mole) of methyl 2-benzyloxy-4-acetamino-5-chlorobenzoate, 246 ml. of ethylene glycol and 87 g. (0.245 mole × 3) of diethylaminoethylamine, are placed in a one liter balloon flask provided with an agitator and a reflux condenser. The mixture is heated in an oil bath at 120°C. for 4 ½ hours. 246 Ml. of 2.5 N sodium carbonate solution previously heated at 90° to 95°C. is then added to the solution and the mixture is maintained under reflux for 1 hour. After cooling 400 ml. of water is added. The benzamide formed crystallizes. It is dried without heating, washed in water and dried in the air. It is then recrystallized with 134 ml. of benzene. N-(diethylaminoethyl)-2-benzyloxy-4-amino-5-chlorobenzamide is obtained in the form of white crystals (melting point: 95°C.)

EXAMPLE II

N-Diethylaminoethyl)-2-Benzyloxy-3,5-Dichlorobenzamide

129 G. (0.36 mole × 3) of thionyl chloride and 53.5 g. (0.18 mole) of 2-benzyloxy-3,5-dichlorobenzoic acid are placed in a 500 ml. balloon flask provided with a reflux condenser.

The mixture is heated in a water bath until the reagents dissolve (2 hours 45 min.). The mixture is then cooled and the second half of the 2-benzyloxy-3,5-dichlorobenzoic acid (53.5 g.) is then added. The mixture is heated at from 40° to 45°C. for about 2 hours and then at 70°C. for the same period. The excess of thionyl chloride is distilled off. 115 G. of 2-benzyloxy-3,5-dichlorobenzoyl chloride are obtained.

43 G. (0.365 mole) of diethylaminoethylamine dissolved in 110 ml. of methylethylketone is placed in a one liter balloon flask provided with an agitator, a thermometer and a dropping funnel. While maintaining the internal temperature of the balloon flask at from 0° to 5°C., the acid chloride dissolved in 90 ml. of methylethylketone is poured in drop by drop with agitation.

To prepare the oxalate of the N-(diethylaminoethyl)-2-benzyloxy-3,5-dichlorobenzamide formed, 500 ml. of water and 37 ml. of 20 percent ammonia are added. The base is extracted with methylene chloride. It is dried on potassium carbonate and the solvent is distilled in a water bath. The 70 g. (0.1775 mole) of the base obtained is then dissolved in 250 ml. of absolute alcohol and 19 g. of oxalic acid (0.1775 mole + 20 percent excess) is added. N-(diethylaminoethyl)-2-benzyloxy-3,5-dichlorobenzamide oxalate crystallizes. It is dried without heating, washed on a filter with alcohol and is dried. It is a white solid. (melting point: 74°C.)

EXAMPLE III

N-(Morpholinoethyl)-2-Benzyloxy-4-Amino-5-Chlorobenzamide

48 G. (0.144 mole) of methyl 2-benzyloxy-4-acetamino-5-chlorobenzoate, 150 ml. of ethylene glycol and 56 g. (0.144 mole × 3) of morpholinoethylamine are placed in a 1 liter balloon flask provided with a reflux condenser. The mixture is heated in an oil bath at 120°C. for approximately 10 hours. 150 Ml. of 2.5 N sodium carbonate solution previously heated to 95°C. is then added and the mixture is maintained under reflux for 1 hour. After cooling 150 ml. of water is added. The benzamide formed is dried without heating, washed with 200 ml. of water and is dried. 35 G. of N-(morpholinoethyl)-2-benzyloxy-4-amino-5-chlorobenzamide (melting point: 155°C.) are obtained.

If the corresponding N-(thiamorpholinoethyl)-2-benzyloxy-4-amino-5-chlorobenzamide is desired, the procedure in this Example is followed except that 63 g. of thiamorpholinoethylamine is employed instead of the 56 g. of morpholinoethylamine. Again, if N-(piperazinoethyl)-2-benzyloxy-4-amino-5-chlorobenzamide is desired, the same procedure is followed except that 56 g. of piperazinoethylamine are used instead of the 56 g. of morpholinoethylamine.

EXAMPLE IV

N-(1-Ethyl-2-Pyrrolidylmethyl)-2-Benzyloxy-3,5-Dichlorobenzamide

2-Benzyloxy-3,5-dichlorobenzoyl chloride is prepared as described in Example II.

21 G. (0.158 mole) of 1-ethyl-2-aminomethyl pyrrolidine dissolved in 40 ml. of methylethylketone is placed in a 500 ml. balloon flask provided with an agitator, a thermometer and a dropping funnel. While maintaining the internal temperature of the balloon flask at from 0° to 5°C., the 50 g. (0.158 mole) of acid chloride dissolved in 30 ml. of methylethylketone is poured in drop by drop under agitation. When the operation of addition is complete, agitation is continued for 3 more hours while the temperature is allowed to rise. The mixture is diluted with 400 ml. of water and the methylethylketone is distilled.

The solution obtained is filtered with 2 g. of animal black. The base is precipitated with ammonia and extracted with methylene chloride. The organic layer is dried on potassium carbonate. The methylene chloride is distilled in a water bath until it has constant weight. N-(1-ethyl-2-pyrrolidylmethyl)-benzyloxy-3,5-dichlorobenzamide is obtained, occurring in the form of white crystals (melting point: 74°C.).

If it is desired to produce the corresponding N-(1-ethyl-2-piperidylmethyl)-2-benzyloxy-3,5-dichlorobenzamide, the stoichiometrically equivalent quantity of 1-ethyl-2-aminomethyl piperidine is employed in the procedure of this Example instead of the 1-ethyl-2-aminomethyl pyrrolidine.

EXAMPLE V

N-(Diethylaminoethyl)-2-(p-Chlorobenzyloxy)-3,5-Dichlorobenzamide

16 G. of diethylaminoethylamine dissolved in 40 ml. of methylethylketone is introduced into a 4.5 liter three-neck balloon flask provided with an agitator, a thermometer and a dropping funnel.

While maintaining the internal temperature of the balloon flask at from 0° to 5°C., 48 g. of 2-(p-chlorobenzyloxy)-3,5-dichlorobenzoyl chloride dissolved in 100 ml. of methylethylketone is poured in drop by drop and with agitation.

Agitation is effected for 2 hours at ambient temperature and the mixture is left at rest for 1 night at +4°C. The product formed is dried without heating, washed being made into a paste with acetone and is dried at 50°C.

45 G. of N-(diethylaminoethyl)-2-(p-chlorobenzyloxy)-3,5-dichlorobenzamide is obtained. Yield 70.5 percent. Melting point: 136°–140°C.

EXAMPLE VI

N-(Diethylaminoethyl)-2-Phenethyloxy-3,5-Dichlorobenzamide

15 G. of diethylaminoethylamine is dissolved in 38 ml. of methylethylketone in a 500 ml. balloon flask. 41 G. of 2-phenethyloxy-3,5-dichlorobenzoyl chloride in solution in 32 ml. of methylethylketone is added drop by drop, the temperature being maintained at from 0° to 50°C.

The mixture is allowed to return to ambient temperature while agitation is maintained. It is left overnight at +4°C., 185 ml. of water is added and the methylethylketone is distilled.

The solution obtained is filtered with 3 g. of animal black. The base is precipitated by adding ammonia and is extracted with methylene chloride. The organic layer is dried on potassium carbonate. The methylene chloride is distilled in a water bath, operation being concluded under vacuum.

40 G. of N-(diethylaminoethyl)-2-phenethyloxy-3,5-dichlorobenzamide is obtained. Yield 78.7 percent.

The citrate is obtained by adding 25 g. (0.1 mole + 10 percent excess) of citric acid dissolved in heated 200 ml. of isopropanol to 40 g. of the base dissolved in 80 ml. of isopropanol.

The mixture is left overnight at +4°C. and the citrate crystallizes. It is dried without heating, washed with ice cold isopropanol and is dried.

50 G. of N-(diethylaminoethyl)-2-phenethyloxy-3,5-dichlorobenzamide citrate is obtained. Yield: 85 percent. Melting point: 87°C.

EXAMPLE VII

N-(Pyrrolidylethyl)-2-Benzyloxy-4-Amino-5-Bromobenzamide

Into a 1 liter flask, provided with a mechanical stirrer, a thermometer and a cooling tube, 73 g. of methyl-2-benzyloxy-4-acetamino-5-bromobenzoate dissolved in 220 ml. of glycol are mixed with 67 g. of pyrrolidinoethylamine. The mixture is warmed to 120°C. during 4 hours and becomes black. Then is added (without cooling) 250 ml. of soda lye (0.5 N), and the produce is refluxed for 1 hour.

The resulting compound is diluted with 400 ml. of water and cooled. A solid precipitation is separated and dried at 50°C. The product is crystallized with absolute alcohol (40 g.). It melts at 140°C.

EXAMPLE VIII

N-(Piperidinoethyl)-2-Benzyloxy-4-Amino-5-Bromobenzamide

Into a 1 liter flask provided with a mechanical stirrer, a thermometer and a cooling tube are mixed 80 g. of methyl-2-benzyloxy-4-acetamino-5-bromobenzoate, dissolved with 250 ml. of glycol and 81 g. of piperidinoethylamine. After warming to 120°C. during five hours, 250 ml. of soda lye (2.5 N) are added. The mixture is refluxed for 1 hour, and then cooled and diluted with 400 ml. of water. The product is allowed to crystallize. It is drained, washed and dried. It yields white crystals, melting at 133°C.

Tests were conducted to determine the toxicity and therapeutic efficacy of the compounds described in this application and in the copending application, Ser. No. 714,795.

The $LD_{50}$ values on mice and rats showed the safety of the compounds of this invention at effective therapeutic doses or concentrations. The following tables show the $LD_{50}$ of such compounds when tested with mice and rats:

| COMPOUNDS | $LD_{50}$ in mg./kg. (compounds in base form) I.V. | |
|---|---|---|
| | Mouse | Rat |
| N-(diethylaminoethyl)-2-benzyloxy-4-amino-5-chlorobenzamide | 6.4 | |
| N-(diethylaminoethyl)-2-benzyloxy-3,5-dichlorobenzamide | 15 | 14.5 |
| N-(morpholinoethyl)-2-benzyloxy-4-amino-5-chlorobenzamide | 37 | |
| N-(1-ethyl 2 pyrrolidylmethyl)-2-benzyloxy-3,5-dichlorobenzamide | 12 | 13.5 |

| COMPOUNDS | $LD_{50}$ in mg./kg. (compounds in base form) I.P. |
|---|---|
| N-(diethylaminoethyl)-2-benzyloxy 4-amino-5-chlorobenzamide | 41.9 |
| N-(diethylaminoethyl)-2-benzyloxy-3,5-dichlorobenzamide | 96 |
| N-(morpholinoethyl)-2-benzyloxy-4-amino-5-chlorobenzamide | >150 |
| N-(1-ethyl-2-pyrrolidylmethyl)-2-benzyloxy-3,5-dichlorobenzamide | 108 |

| COMPOUNDS | $LD_{50}$ in mg./kg. (compounds in base form) S.C. |
|---|---|
| N-(diethylamino)-2-benzyloxy-4-amino-5-chlorobenzamide | 50 |
| N-(diethylaminoethyl)-2-benzyloxy-3,5-dichlorobenzamide | 186 |
| N-(morpholinoethyl)-2-benzyloxy-4-amino-5-chlorobenzamide | >150 |
| N-(1-ethyl-2-pyrrolidylmethyl)-2-benzyloxy-3,5-dichlorobenzamide | 376 |

| COMPOUNDS | $LD_{50}$ in mg./kg. (compounds in base form) per os |
|---|---|
| N-(diethylaminoethyl)-2-benzyloxy-4-amino-5-chlorobenzamide | 220 |
| N-(diethylaminoethyl)-2-benzyloxy-3,5-dichlorobenzamide | 640 |
| N-(morpholinoethyl)-2-benzyloxy-4-amino-5-chlorobenzamide | 1.5 |
| N-(1-ethyl-2-pyrrolidylmethyl)-2-benzyloxy-3,5-dichlorobenzamide | 576 |

The local anesthetic properties of the benzamides of the present invention were revealed from the different tests described hereinafter.

1. Local surface anesthesia was determined by the Regnier method which comprises studying the suppression of the oculopalpebral reflex on the rabbit cornea.

Studying a group of 10 rabbits, the depth of corneal anesthesia obtained after dropping into the eye 11 drops of the aqueous solution of the product to be studied by comparison with that produced by 2 aqueous solutions of cocaine hydrochloride in different concentrations. The experiment is effected in cross tests at intervals of 1 week.

The result summarized hereinafter in the tables are given by way of example. The average number per hour of strokes with a coarse hair on the cornea which give no reaction indicate the degree of anesthesia. A number equal to 1,300 corresponds to complete anesthesia for 60 minutes. A number equal to 13 corresponds to an absence of anesthesia.

| PRODUCTS | Concentration | Average number per hour of strokes with coarse hair |
|---|---|---|
| Cocaine | 0.5% | 676 |
| N-(diethylaminoethyl)-2-benzyloxy-3,5-dichlorobenzamide | 0.02% | 493 |
| Cocaine | 0.25% | 245 |
| Cocaine | 0.5% | 588 |
| N-(1-ethyl-2-pyrrolidylmethyl)-2-benzyloxy-3,5-dichlorobenzamide | 0.5% | 1017 |
| Cocaine | 1.0% | 986 |

From these results can be deduced the local anesthetic power of these two compounds with respect to cocaine

| PRODUCTS | Concentration | Concentration of cocaine giving the same anesthetic power | Activity Index |
|---|---|---|---|
| N-(diethylaminoethyl)-2-benzyloxy-3,5-dichlorobenzamide | 0.02% | 0.39% | 20 |
| N-(1-ethyl-2-pyrrolidylmethyl)-2-benzyloxy-3,5-dichlorobenzamide | 0.5% | 1.0% | 2 |
| Cocaine | 0.5% | 1.0% | 1 |

2. Anesthesia of small blood vessels was effected by intramuscular injection of the product to be studied into the theca of the sciatic nerve of a rat. The criterion of anesthesia is the non-withdrawal of the rear leg after pinching the median toes with a jawless Pean pincer.

Three groups of ten male rats are treated with increasing concentrations of the anesthetic under study. In each group the percentage of animals which does not react to the pinching of the leg is measured, which permits the effective anesthetic dose 50 to be determined. The experiments are effected on two compounds of the invention given by way of example in comparison with xylocaine.

| PRODUCTS | Concentrations in mg/ml | % of anesthesia | E.D.50 in mg/ml base |
|---|---|---|---|
| Experiment No. 1 | | | |
| N-(diethylaminoethyl)-2-benzyloxy-3,5-dichlorobenzamide | 1 | 67% | |
| | 0.5 | 37% | 0.68 |
| | 0.25 | 7% | |
| Xylocaine | 8 | 73% | |
| | 4 | 60% | 3.2 |
| | 2 | 33% | |
| Experiment No. 2 | | | |
| N-(diethylaminoethyl)-2-benzyloxy-3,5-dichlorobenzamide | 1.2 | 56% | |
| | 0.6 | 33% | 1 |
| | 0.3 | 13% | |
| Xylocaine | 8 | 66% | |
| | 4 | 60% | 3.15 |

| | | | |
|---|---|---|---|
| | 2 | 36% | |

Experiment No. 1

| | | | |
|---|---|---|---|
| N-(1-ethyl-2-pyrrolidyl-methyl)-2-benzyloxy-3,5-dichlorobenzamide | 3 | 60% | |
| | 1.5 | 43% | 1.9 |
| | 0.75 | 33% | |
| Xylocaine | 8 | 80% | |
| | 4 | 57% | 3 |
| | 2 | 40% | 3 |

Experiment No. 2

| | | | |
|---|---|---|---|
| N-(1-ethyl-2-pyrrolidyl-methyl)-2-benzyloxy-3,5-dichlorobenzamide | 2 | 50% | |
| | 1 | 40% | 1.8 |
| | 0.5 | 17% | |
| Xylocaine | 8 | 67% | |
| | 4 | 47% | 3.8 |
| | 2 | 37% | |

From these results can be deduced the local anesthetic power of these two compounds with respect to xylocaine.

| PRODUCTS | Activity Index |
|---|---|
| N-(diethylaminoethyl-2-benzyloxy-3,5-dichlorobenzamide | 3 to 4 |
| N(-1-ethyl-2-pyrrolidylmethyl)-2-benzyloxy-3,5-dichlorobenzamide | 1.5 to 2 |
| Xylocaine | 1 |

3. Research into infiltration anesthesia is effected by intradermic injection into the skin on the back of a guinea-pig. The criterion of the anesthesia is the suppression of the platysma tremor produced by the prick of a pin. Intradermic injections of 0.2 ml. of solution of the products to be studied in increasing concentrations were effected on groups of 10 guinea-pigs. The depth of anesthesia is measured with respect to procaine.

| PRODUCTS for 30 m. | Concentrations in mg/ml | Average Number of Pinpricks | % of Anesthesia | E.D. 50 in mg/ml base |
|---|---|---|---|---|
| N-(diethylaminoethyl)-2-benzyloxy-3,5-dichlorobenzamide | 0.4 | 19.6 | 54% | |
| | 0.2 | 12.15 | 34% | 0.35 |
| | 0.1 | 5.1 | 14% | |
| Procaine | 5 | 27.55 | 76% | |
| | 2.5 | 14.05 | 39% | 3 |
| | 1.25 | 4.9 | 14% | |
| N-(1-ethyl-2-pyrrolidylmethyl)-2-benzyloxy-3,5-dichlorobenzamide | 1.25 | 34.1 | 95% | |
| | 0.5 | 12.5 | 35% | ≠≠0.6 |
| | 2.5 | 20.4 | 57% | |
| Procaine | | | | ≠≠2.2 |
| | 1.25 | 6.65 | 18% | |

The experimental results were confirmed in clinics where the products of the invention were administered in the form of tablets, phials, ointments or aerosols of one of their pharmacologically acceptable salts.

What is claimed is:

1. A compound selected from the class consisting of 2-aryl-alkyloxy benzamides and their pharmaceutically acceptable acid and quaternary ammonium salts, said substituted 2-arylalkyloxy benzamides having the formula:

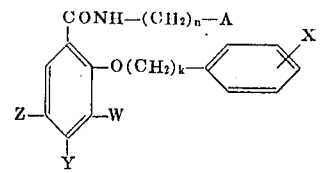

in which A is a monovalent heterocyclic radical having the formula:

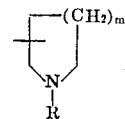

in which $m$ is a positive integer less than 4; R is an alkyl group having from one to five carbon atoms; W, Y and Z are hydrogen, halogen, amino or alkylamino in which the alkyl group has from one to five carbon atoms; X is hydrogen or halogen and $k$ is 1 or 2; $n$ is 1, 2 or 3; at least one of W, Y and Z being other than hydrogen.

2. A compound of claim 1 in which $m$ of the formula is 1.

3. A compound of claim 1 in which $m$ of the formula is 2.

4. A compound of claim 1 in which $m$ of the formula is 3.

5. A compound of claim 1 in which $n$ of the formula is 1.

6. A compound of claim 1 in which $n$ of the formula is 2.

7. A compound of claim 1 in which $n$ of the formula is 3.

8. A compound of claim 1 which is N-(1-ethyl-2-pyrrolidyl-methyl)-2-benzyloxy-3,5-dichlorobenzamide.

9. A compound of claim 1 which is N-(1-ethyl-2-piperidyl-methyl)-2-benzyloxy-3,5-dichlorobenzamide.

10. A compound of claim 1 which is N-(pyrrolidylethyl)-2-benzyloxy-4-amino-5-bromobenzamide.

* * * * *